Dec. 8, 1925.  
E. H. WEHLANN  
APPARATUS FOR MAKING PISTON RINGS  
Filed Dec. 8, 1919  
1,565,220
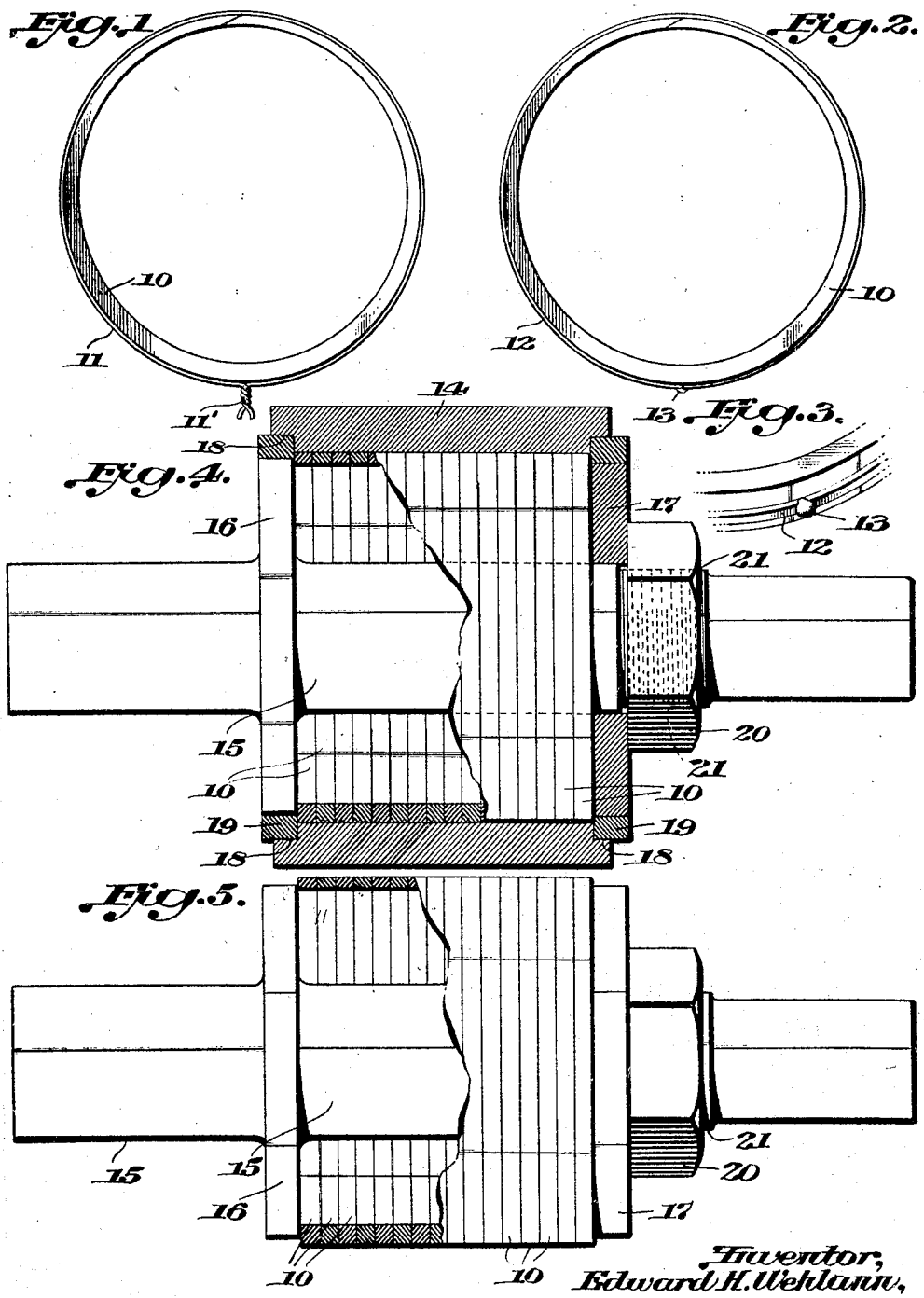

Patented Dec. 8, 1925.

1,565,220

UNITED STATES PATENT OFFICE.

EDWARD H. WEHLANN, OF DETROIT, MICHIGAN, ASSIGNOR TO PACKARD MOTOR CAR COMPANY, OF DETROIT, MICHIGAN, A CORPORATION OF MICHIGAN.

APPARATUS FOR MAKING PISTON RINGS.

Application filed December 8, 1919. Serial No. 343,304.

*To all whom it may concern:*

Be it known that I, EDWARD H. WEHLANN, a citizen of the United States, and resident of Detroit, Wayne County, State of Michigan, have invented certain new and useful Improvements in Apparatus for Making Piston Rings, of which the following is a specification.

This invention relates to processes and apparatus for making piston rings.

The finishing or grinding of piston rings has heretofore been subject to considerable difficulty since the rings after being ground do not accurately fit the walls of the cylinder and, therefore, cause a leakage of the gas within the cylinder past the piston. It has been customary in the finishing of piston rings to place a series of rings inside of a cylindrical sleeve, the sleeve being of the correct diameter to hold the rings in contracted position. A clamp is then placed within the sleeve and the rings are rigidly held between its two clamping flanges. The clamp and the rings held thereby are then withdrawn from the sleeve and the outer peripheral surfaces of the rings are ground to size. Rings treated in the manner just described when placed on the piston and in the cylinder are found to have "high spots" located near the split ends of the ring and also at the opposite side of the ring. These "high spots" contact with the walls of the cylinder but between the "high spots" are formed "low spots" which cause leakage. The "high spots" which result from the process of manufacture just described are caused by the distortion of the rings, as they are forced into the sleeve, from the shape they would naturally assume if the rings were contracted by means of a flexible or nonrigid band.

The present invention has for its object to produce a ring which is not subject to the objections above outlined and a ring that will bear evenly at all points against the inner wall of the cylinder.

Further objects will appear as the description proceeds.

The object above outlined is attained in the present instance by contracting the ring without distorting it and by grinding the ring so contracted to a true cylindrical shape. In carrying out the invention one of the rings to be finished is contracted by means of a flexible member which encircles the ring and gradually contracts the ring until the split between the ends of the ring is closed. When the ring has been so contracted it is retained in this position by some suitable means.

The ring so contracted may be placed in a clamp and ground to the proper size, or, if it is desired to finish a plurality of rings, the contracted ring may be used as a pattern or templet by which to shape the inner wall of a sleeve which may be used for holding a series of rings in contracted condition. After the sleeve has been made and the rings have been placed therein, a clamp is inserted in the sleeve and the contracted rings are clamped together. The rings and clamp are then withdrawn from the sleeve and the outer peripheral surfaces of the rings are ground to correct size.

One embodiment of the invention has been illustrated in the accompanying drawings, in which:

Fig. 1 illustrates the method of contracting the ring;

Fig. 2 illustrates the contracted ring with the retaining member in position around the ring;

Fig. 3 is a perspective view of a portion of the contracted ring showing the soldered ends of the retaining band illustrated in Fig. 2;

Fig. 4 illustrates in longitudinal section the prepared sleeve with the arbor and rings positioned therein, and Fig. 5 illustrates in longitudinal section a plurality of clamped rings ready to be ground.

The first step in my improved process of manufacturing piston rings is illustrated in Fig. 1, wherein a piston ring 10 is surrounded by a flexible wire 11, the free ends of the wire being twisted together as shown at 11′ by any suitable means until the split between the ends of the ring is closed. Since the ring is contracted by means of a flexible member the ring is not distorted in any way and, therefore, will assume its natural shape if allowed again to expand.

After the ring has been so contracted, it may be inserted in a clamp and ground to size after the flexible member or band has been removed, but it is probable that, for economical reasons, a manufacturer would desire to finish a plurality of rings at the same time and in order that this may be done the contracted ring is encircled by a flexible band such as a copper band 12, illustrated in Fig. 2, the ends of the band being connected together, as by solder 13, to retain the ring in contracted position. This ring is then used as a pattern or templet and a sleeve is prepared, the inner surface of the sleeve corresponding in size and shape to the outer peripheral surface of the contracted ring. Such a prepared sleeve is illustrated at 14 in Fig. 4 and a plurality of rings 10 is inserted in the cylinder with their split portions in substantial alignment and disposed in the same relative position as the split portion of the original pattern ring. It is important that the rings inserted in the cylinder be as nearly homogeneous as possible with the ring first contracted, for otherwise the rings would not be contracted without distortion.

After the rings have been inserted in the sleeve an arbor 15 is inserted in the sleeve, this arbor being provided with an annular flange 16 positioned adjacent one end thereof and an adjustable collar 17 adjacent the opposite end thereof. The sleeve 14 with the rings 10 positioned therein is properly centered on the arbor 15, this centering being accomplished on a suitable device, such as a lathe in order to insure a uniform amount of material being ground from the outer surfaces of the rings. After this centering has been accomplished, the sleeve is provided with annular cut-away portions or recesses 18 for the reception of collars 19 which are positioned between the members 16 and 17 and the sleeve and center the sleeve on the arbor. A nut 20 engages a screw threaded portion 21 on the arbor and clamps the collar 17 against the outer piston ring, thereby retaining the rings in position between the collar 17 and the flange 16. The arbor or clamp and the piston rings are then withdrawn from the sleeve 14 and the outer peripheral surfaces of the rings are ground to correct size.

By carrying out the above described process of manufacturing piston rings, it will be evident that the rings produced will be free from distortion and will expand evenly and will have true cylindrical outer peripheral surfaces.

While one embodiment of the invention has been illustrated and described, it should be understood that the invention is capable of modification and that modifications and changes may be made without departing from the spirit or scope of the invention, as expressed in the following claims.

What I claim and desire to secure by Letters Patent is:

1. In an apparatus for producing piston rings, a sleeve for holding the rings preliminary to clamping, the inner contour of said sleeve corresponding in size and shape to the contracted ring, said sleeve having an annular recess at one end, and clamping means having a centering device cooperating with said recess.

2. In an apparatus for producing piston rings, a sleeve for holding the rings preliminary to clamping, the inner contour of said sleeve corresponding in size and shape to the contracted ring, said sleeve having annular recesses at its ends, and centering rings for the clamp arranged in said recesses.

3. In an apparatus for producing piston rings, a sleeve for holding the rings preliminary to clamping and grinding, the inner contour of said sleeve corresponding in size and shape to the outer periphery of a ring which has been contracted without distortion.

4. In an apparatus for producing piston rings, a sleeve for holding the rings preliminary to clamping and grinding, the inner contour of said sleeve corresponding in size and shape to the outer periphery of a ring which has been contracted by means of a flexible band.

In testimony whereof I affix my signature.

EDWARD H. WEHLANN.